(12) United States Patent
Otani et al.

(10) Patent No.: US 8,717,432 B2
(45) Date of Patent: May 6, 2014

(54) GEOGRAPHICAL DATA COLLECTING DEVICE

(75) Inventors: Hitoshi Otani, Itabashi-ku (JP); Mitsutaka Nakamura, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 1086 days.

(21) Appl. No.: 12/380,152

(22) Filed: Feb. 24, 2009

(65) Prior Publication Data
US 2009/0225161 A1  Sep. 10, 2009

(30) Foreign Application Priority Data

Mar. 4, 2008  (JP) ................................. 2008-053110

(51) Int. Cl.
H04N 7/18  (2006.01)
(52) U.S. Cl.
USPC ........... 348/135; 348/103; 348/106; 382/113; 382/209; 382/190; 382/278; 382/106; 356/4.04; 356/5.02; 356/139.01
(58) Field of Classification Search
USPC .......... 348/103, 106, 135; 382/113, 106, 190, 382/209, 278; 356/139.01, 4.04, 4.03, 4.01, 356/5.02
See application file for complete search history.

(56) References Cited

U.S. PATENT DOCUMENTS

| | | |
|---|---|---|
| 4,717,251 A | 1/1988 | Wells et al. |
| 4,802,757 A | 2/1989 | Pleitner et al. |
| 5,098,185 A | 3/1992 | Watanabe et al. |
| 5,247,356 A | 9/1993 | Ciampa |
| 5,361,217 A | 11/1994 | Makimura et al. |
| 5,539,513 A | 7/1996 | Dunne |

(Continued)

FOREIGN PATENT DOCUMENTS

| | | |
|---|---|---|
| CN | 1445509 A | 10/2003 |
| CN | 1896686 A | 1/2007 |

(Continued)

OTHER PUBLICATIONS

European communication dated Sep. 14, 2010 in corresponding foreign application (EP09002813.5).

(Continued)

Primary Examiner — Thuong Nguyen
(74) Attorney, Agent, or Firm — Nields, Lemack & Frame, LLC

(57) ABSTRACT

The present invention provides a geographical data collecting device, which comprises a distance measuring unit 5 for projecting a distance measuring light and for measuring a distance to an object to be measured, an image pickup unit 3 for taking an image in a measuring direction, a display unit 6 for displaying an image picked up, a touch panel installed to match a position of screen of the display unit, a tilt sensor 11 for detecting a tilting, an azimuth sensor 12 for detecting a horizontal angle in the measuring direction, and a control arithmetic unit 8, wherein the image pickup unit takes an image of a measurement range, acquires a reference image, is directed to a selected measuring point in the reference image, and acquires a measured image with the measuring point as a center, and wherein said control arithmetic unit calculates the measuring point in the reference image through an image matching of the reference image and the measured image and displays a measuring point on at least one of the reference image or the measured image.

11 Claims, 5 Drawing Sheets

(56) References Cited

U.S. PATENT DOCUMENTS

| | | |
|---|---|---|
| 5,548,409 A | 8/1996 | Ohta et al. |
| 5,647,015 A | 7/1997 | Choate et al. |
| 5,671,451 A | 9/1997 | Takahashi et al. |
| 5,699,149 A | 12/1997 | Kuroda et al. |
| 5,699,444 A | 12/1997 | Palm |
| 5,913,078 A | 6/1999 | Kimura et al. |
| 5,949,529 A | 9/1999 | Dunne et al. |
| 5,988,862 A | 11/1999 | Kacyra et al. |
| 6,025,790 A | 2/2000 | Saneyoshi |
| 6,093,928 A | 7/2000 | Ohtomo et al. |
| 6,396,571 B2 | 5/2002 | Ohtomo et al. ........... 356/5.1 |
| 6,473,716 B1 | 10/2002 | Ohishi et al. |
| 6,480,148 B1 | 11/2002 | Wilson et al. |
| 6,563,574 B2 | 5/2003 | Ohtomo et al. |
| 6,643,004 B2 | 11/2003 | Detweiler et al. |
| 6,859,269 B2 | 2/2005 | Ohtomo et al. |
| 7,256,900 B1 | 8/2007 | Hanaoka |
| 7,804,996 B2 | 9/2010 | Ohtomo et al. |
| 7,933,001 B2 | 4/2011 | Otani et al. |
| 8,280,677 B2 | 10/2012 | Otani et al. |
| 8,319,952 B2 | 11/2012 | Otani et al. |
| 2003/0065446 A1 | 4/2003 | Ootomo et al. |
| 2003/0105400 A1 | 6/2003 | Yawata et al. |
| 2003/0137449 A1 | 7/2003 | Vashisth et al. .......... 342/357.08 |
| 2003/0179361 A1 | 9/2003 | Ohtomo et al. |
| 2004/0037451 A1* | 2/2004 | Kim et al. .................... 382/113 |
| 2006/0044546 A1* | 3/2006 | Lewin et al. ................. 356/4.04 |
| 2006/0167648 A1 | 7/2006 | Ohtani |
| 2006/0192946 A1 | 8/2006 | Walser |
| 2006/0204232 A1 | 9/2006 | Weinberg et al. ............... 396/50 |
| 2007/0008515 A1* | 1/2007 | Otani et al. .................. 356/5.02 |
| 2007/0010924 A1 | 1/2007 | Otani et al. ..................... 701/35 |
| 2007/0133012 A1 | 6/2007 | Euler |
| 2007/0288197 A1 | 12/2007 | Martin ........................... 702/152 |
| 2008/0279447 A1* | 11/2008 | Friedlander et al. .......... 382/154 |
| 2009/0022369 A1* | 1/2009 | Satoh et al. .................. 382/106 |
| 2009/0222237 A1* | 9/2009 | Otani et al. ................... 702/152 |
| 2011/0096319 A1* | 4/2011 | Otani et al. .................. 356/3.14 |

FOREIGN PATENT DOCUMENTS

| | | |
|---|---|---|
| EP | 0542561 A1 | 5/1993 |
| EP | 1219925 A2 | 7/2002 |
| EP | 1 744 122 | 1/2007 |
| JP | 1-184411 A | 7/1989 |
| JP | 1-191013 A | 8/1989 |
| JP | 2-251708 A | 10/1990 |
| JP | 7-4961 A | 1/1995 |
| JP | 9-210649 A | 8/1997 |
| JP | 10-239055 A | 9/1998 |
| JP | 10-246628 A | 9/1998 |
| JP | 11-148822 A | 6/1999 |
| JP | 11-153430 A | 6/1999 |
| JP | 2000-131065 A | 5/2000 |
| JP | 2000-171249 A | 6/2000 |
| JP | 2001-503134 A | 3/2001 |
| JP | 2001-91253 A | 4/2001 |
| JP | 2002-39748 | 2/2002 |
| JP | 2002-131057 A | 5/2002 |
| JP | 2002-202126 A | 7/2002 |
| JP | 2002-271654 | 9/2002 |
| JP | 2002-352224 A | 12/2002 |
| JP | 2003-114126 A | 4/2003 |
| JP | 2003-269958 A | 9/2003 |
| JP | 2004-32286 A | 1/2004 |
| JP | 2004-37424 A | 2/2004 |
| JP | 2004-317237 | 11/2004 |
| JP | 2006-10376 A | 1/2006 |
| JP | 2007-248156 | 9/2007 |
| WO | 98/10246 A1 | 3/1998 |
| WO | 2004/083779 A1 | 9/2004 |
| WO | 2006/040775 A2 | 4/2006 |

OTHER PUBLICATIONS

Office Action dated May 19, 2011 in co-pending U.S. Appl. No. 12/380,225.

European communication dated Jun. 5, 2009.

Chinese Communication dated Dec. 31, 2010 in co-pending foreign application CN 200910118293.2.

Office Action mailed Oct. 7, 2011 in co-pending U.S. Appl. No. 12/380,225.

3rd Tech, DeltaSphere-3000 Laser 3D scene Digitizer Brochure, Jun. 22, 2000, 2 pgs.

Honeywell, 3-Axis Compass Sensor Set/HMC 1055 Brochure, 2009, 1 page.

Chinese Communication dated Dec. 5, 2008 in co-pending foreign application CN 200610101533.4, 8 pages.

European Search Report dated Apr. 8, 2008 in co-pending foreign application EP 05022747, 2 pages.

European Communication dated May 8, 2008 in co-pending foreign application EP 06014085.2, 5 pages.

Japanese Communication, with English translation, mailed May 10, 2011 in co-pending Japanese Patent Application No. 2005-202047, 10 pages.

Office Action dated Sep. 5, 2008 in abandoned U.S. Appl. No. 11/204,638, 10 pages.

Final Rejection dated Feb. 23, 2009 in abandoned U.S. Appl. No. 11/204,638, 13 pages.

Office Action dated Nov. 12, 2009 in abandoned U.S. Appl. No. 11/204,638, 15 pages.

Final Rejection dated Jun. 7, 2010 in abandoned U.S. Appl. No. 11/204,638, 16 pages.

Office Action dated Jun. 28, 2011 in co-pending U.S. Appl. No. 12/984,021, 14 pages.

Final Rejection dated Nov. 10, 2011 in co-pending U.S. Appl. No. 12/984,021, 12 pages.

Japanese Communication, with English translation, mailed Nov. 22, 2011 in co-pending Japanese Patent Application No. 2006-069804.

Notice of Allowance mailed Mar. 22, 2012 in co-pending U.S. Appl. No. 12/380,225.

Office Action mailed May 21, 2012 in co-pending U.S. Appl. No. 12/984,021.

Japanese Communication ("Decision of Patent"), with English translation, mailed Apr. 10, 2012 in co-pending Japanese Patent Application No. JP 2005-202047.

Japanese Communication, with English translation, mailed Jul. 17, 2012 in corresponding Japanese patent application No. JP 2008-053110.

Notice of Allowance mailed Sep. 17, 2012 in co-pending U.S. Appl. No. 12/984,021.

* cited by examiner

GEOGRAPHICAL DATA COLLECTING DEVICE

BACKGROUND OF THE INVENTION

The present invention relates to a portable type geographical data collecting device using GPS. In particular, the invention relates to a geographical data collecting device, by which it is possible to acquire an image data of a place to be measured, to plot a point to be measured in the image, to perform a measurement or the like while visually confirming the point to be measured, and to collect a result of the measurement together with the image data.

In recent years, a global positioning system (GPS) has been widely propagated, and a present position can be acquired by a GPS device in easy manner and with high accuracy, and the present position can be displayed in a map information.

A simple and convenient geographical data collecting device is desired, by which it is possible to measure easily a position of an object to be measured, to acquire an image data of a measuring point or of the object to be measured, and to move easily, when it is necessary to collect subordinate information in addition to a general map information, for instance, when information such as a position of a manhole on a road or a position of a telephone pole are necessary, or when it is necessary to acquire information such as a position and a size of a tree, conditions of a thicket or a bush in a survey on forest or the like, or when it is necessary to acquire information such as a position and a condition of cracking in the ground, or a position and a range, etc. of landslide in a disaster.

In order to cope with such demands, a portable type geographical data collecting device is proposed in the patent publication JP-A-2007-248156.

The geographical data collecting device comprises a GPS device, an image pickup unit, a laser distance measuring unit, a tilt sensor and an azimuth sensor. Using the present position of the geographical data collecting device as acquired by the GPS device as reference, the geographical data collecting device can acquire the position information and the image data of the object to be measured.

By the geographical data collecting device as disclosed in JP-A-2007-248156, the position information relating to the object to be measured and the image data of the surrounding including the object to be measured can be acquired. Then, a plurality of images can be synthesized according to the position data of the image, and an image of wide range, i.e. a measurement range as anticipated, can be obtained.

However, in the geographical data collecting device as described above, images are taken for each measuring operation and the image data must be recorded for each measuring operation. As a result, considerable time is required for recording each measuring operation. This leads to the increase of data amount and to make post-treatment of data more complicated, and further, more time is required.

Further, when the geographical data are to be collected for a range as anticipated, and if a multiple of data must be collected on the object to be measured and on the point to be measured, it is often necessary to perform the operation as quickly as possible. Also, it is often necessary to rely on memorizing ability of the measuring operator as to at which point has been measured. In this respect, the measuring points may often be duplicated, or some of the measuring points may be omitted.

SUMMARY OF THE INVENTION

An object of the present invention is that a measuring point is plotted in each measuring operation on a reference image which shows an anticipated measurement range and an operator can perform the measuring operation while an operator can confirm the points already measured and a reliability and an efficiency of the measuring operation is improved.

To attain the above object, the geographical data collecting device according to the present invention comprises a distance measuring unit for projecting a distance measuring light and for measuring a distance to an object to be measured, an image pickup unit for taking an image in a measuring direction, a display unit for displaying an image picked up, a touch panel installed to match a position of screen of the display unit, a tilt sensor for detecting a tilting, an azimuth sensor for detecting a horizontal angle in the measuring direction, and a control arithmetic unit, wherein the image pickup unit takes an image of a measurement range, acquires a reference image, and is directed to a selected measuring point in the reference image, and acquires a measured image with the measuring point as a center, and wherein the control arithmetic unit calculates the measuring point in the reference image through an image matching of the reference image and the measured image and displays a measuring point on at least one of the reference image or the measured image.

Also, the present invention provides the geographical data collecting device as described above, wherein the control arithmetic unit additionally displays the measuring points on the reference image sequentially as the measurement operation proceeds. Further, the present invention provides the geographical data collecting device as described above, wherein the measured image includes the measuring points and is a part of an image taken by the image pickup unit, and wherein a center of a searching range for the purpose of matching in the reference image is set up according to a vertical angle and a horizontal angle obtained by the tilt sensor and the azimuth sensor at the time when the measured image is acquired. Also, the present invention provides the geographical data collecting device as described above, wherein the control arithmetic unit sets the searching range to such a range as to include an extent of measurement errors of the tilt sensor and the azimuth sensor with respect to the measured image. Further, the present invention provides the geographical data collecting device as described above, wherein the control arithmetic unit sets, as reference, the horizontal angle and the azimuth angle measured by the tilt sensor and the azimuth sensor at the time when the reference image is taken and compensates a vertical angle and a horizontal angle according to the measuring points calculated based on the result of matching. Also, the present invention provides the geographical data collecting device as described above, wherein the control arithmetic unit displays a plurality of measuring points to match a plurality of measurements on the reference image and calculates a horizontal distance between two measuring points on the reference image as designated via the touch panel. Further, the present invention provides the geographical data collecting device as described above, wherein the control arithmetic unit displays a plurality of measuring points to match a plurality of measurements on the reference image and calculates a horizontal area enclosed by at least three measuring points on the reference image as designated via the touch panel.

Also, the present invention provides the geographical data collecting device as described above, further comprising a GPS device, wherein the control arithmetic unit determines the measuring points through the matching of the reference image and the measured image based on geographical data obtained by the GPS device and based on the vertical angle, the horizontal angle and the azimuth angle which are initial values of the matching and are measured by the tilt sensor and the azimuth sensor when the reference image is taken, the cotrol arithmetic unit corrects the vertical angle and the horizontal angle based on the measuring points obtained, and the arithmetic unit calculates the three-dimensional coordinates of the measuring point based on the corrected vertical angle and the corrected horizontal angle and on the results of distance measurement.

Further, the present invention provides the geographical data collecting device as described above, wherein the azimuth sensor is a magnetic azimuth sensor and determines data of total circumference in horizontal direction and in vertical direction before use of the geographical data collecting device, performs compensation by interpolation based on the data of total circumference, and compensates the results of detection. Also, the present invention provides the geographical data collecting device as described above, wherein the control arithmetic unit determines a second measuring point on the reference image through image matching of the reference image and the measured image, the control arithmetic unit determines a third measuring point on the measured image through reverse image matching from the reference image to the measured image, and in case coordinates of the third measuring point on the measured image do not concur with coordinates of the first measuring point obtained at the time of measurement, it is judged as mis-matching, and the control arithmetic unit permits to designate the measuring point on the reference image manually from the touch panel, and the control arithmetic unit performs re-matching of the reference image and the measured image based on the designated measuring point.

The present invention provides a geographical data collecting device, which comprise a distance measuring unit for projecting a distance measuring light and for measuring a distance to an object to be measured, an image pickup unit for taking an image in a measuring direction, a display unit for displaying an image picked up, a touch panel installed to match a position of screen of the display unit, a tilt sensor for detecting a tilting, an azimuth sensor for detecting a horizontal angle in the measuring direction, and a control arithmetic unit, wherein the image pickup unit takes an image of a measurement range, acquires a reference image, and is directed to a selected measuring point in the reference image, and acquires a measured image with the measuring point as a center, and wherein the control arithmetic unit calculates the measuring point in the reference image through an image matching of the reference image and the measured image and displays a measuring point on at least one of the reference image or the measured image. As a result, it is possible to identify each measuring point, and this leads to the increase of a reliability of the operation and to the improvement of a working efficiency.

Also, the present invention provides the geographical data collecting device as described above, wherein the control arithmetic unit additionally displays the measuring points on the reference image sequentially as the measurement operation proceeds. As a result, it is possible to identify each measuring point and a working condition of the measuring operation, to prevent the duplication of measuring operations and omission of measurement, and to increase the reliability of operation and to improve the working efficiency.

Further, the present invention provides the geographical data collecting device as described above, wherein the measured image includes the measuring points and is a part of an image taken by the image pickup unit, and wherein a center of a searching range for the purpose of matching in the reference image is set up according to a vertical angle and a horizontal angle obtained by the tilt sensor and the azimuth sensor at the time when the measured image is acquired. As a result, the amount of data taken as an object of image processing can be reduced. Because there is no need to perform the image matching on the whole area of the reference image, the time required for calculation can be shortened, and the burden on the control arithmetic unit can be decreased.

Also, the present invention provides the geographical data collecting device as described above, wherein the control arithmetic unit sets the searching range to such a range as to include an extent of measurement errors of the tilt sensor and the azimuth sensor with respect to the measured image. As a result, it is possible to perform image matching within minimum searching range and without error and to reduce the burden of calculation processing.

Further, the present invention provides the geographical data collecting device as described above, wherein the control arithmetic unit sets, as reference, the horizontal angle and the azimuth angle measured by the tilt sensor and the azimuth sensor at the time when the reference image is taken and compensates a vertical angle and a horizontal angle according to the measuring points calculated based on the result of matching. As a result, even when considerable errors may occur in the azimuth sensor, it is possible to improve the relative measurement accuracy between the measuring points.

Also, the present invention provides the geographical data collecting device as described above, wherein the control arithmetic unit displays a plurality of measuring points to match a plurality of measurements on the reference image and calculates a horizontal distance between two measuring points on the reference image as designated via the touch panel. Accordingly, the distance between two points can be calculated accurately by simple procedure.

Further, the present invention provides the geographical data collecting device as described above, wherein the control arithmetic unit displays a plurality of measuring points to match a plurality of measurements on the reference image and calculates a horizontal area enclosed by at least three measuring points on the reference image as designated via the touch panel. As a result, the measurement of each area can be calculated by simple operation and with accuracy.

Also, the present invention provides the geographical data collecting device as described above, further comprising a GPS device, wherein the control arithmetic unit determines the measuring points through the matching of the reference image and the measured image based on geographical data obtained by the GPS device and based on the vertical angle, the horizontal angle and the azimuth angle which are initial values of the matching and are measured by the tilt sensor and the azimuth sensor when the reference image is taken, the control arithmetic unit corrects the vertical angle and the horizontal angle based on the measuring points obtained, and the control arithmetic unit calculates the three-dimensional coordinates of the measuring point based on the corrected vertical angle and the corrected horizontal angle and on the results of distance measurement. As a result, the three-dimensional coordinates of the measuring points can be obtained in easy and simple manner without requiring complicated working procedure.

Further, the present invention provides the geographical data collecting device as described above, wherein the azimuth sensor is a magnetic azimuth sensor and determines data of total circumference in horizontal direction and in vertical direction before use of the geographical data collecting device, performs compensation by interpolation based on the data of total circumference, and compensates the results of detection. Thus, even when a magnetic compass is used as the azimuth sensor, detection accuracy can be improved over total circumference.

Also, the present invention provides the geographical data collecting device as described above, wherein the control arithmetic unit determines a second measuring point on the reference image through image matching of the reference image and the measured image, the control arithmetic unit determines a third measuring point on the measured image through reverse image matching from the reference image to the measured image, and in case the coordinates of the third measuring point on the measured image do not concur with the coordinates of the first measuring point obtained at the time of measurement, it is judged as mis-matching, and the control arithmetic unit permits to designate the measuring point on the reference image manually from the touch panel, and the control arithmetic unit performs re-matching of the reference image and the measured image based on the designated measuring point. This makes it possible to improve the accuracy of the measurement point displayed on the reference image and to increase the accuracy of the three-dimensional coordinates at the measuring point obtained.

DETAILED DESCRIPTION OF THE PREFERRED EMBODIMENT

A description will be given below on the best mode for carrying out the present invention by referring to the attached drawings.

First, referring to FIG. 1, a description will be given on a geographical data collecting device, to which the present invention is carried out.

Figure 1:
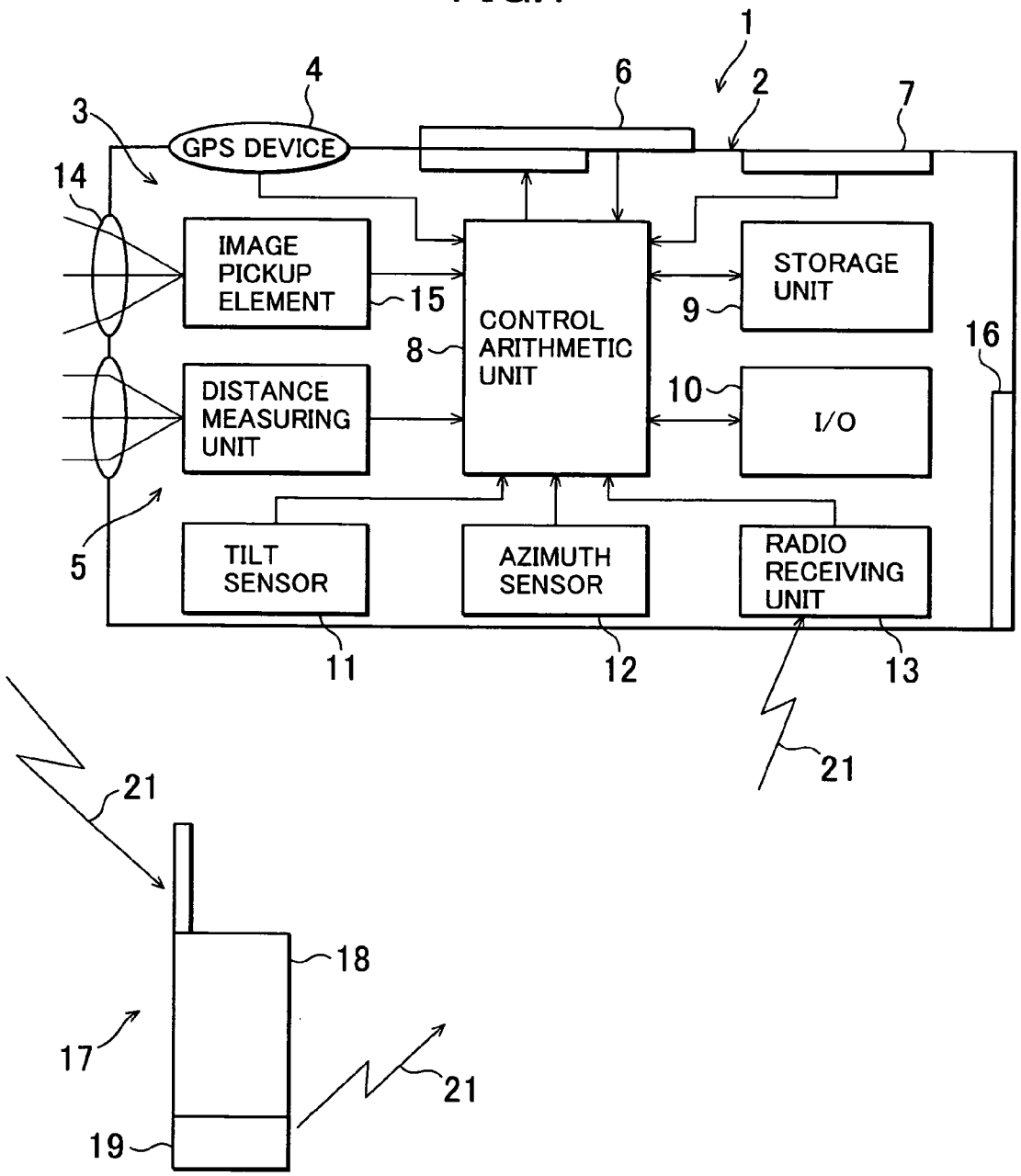
FIG. 1 is a schematical block diagram to show an example of a geographical data collecting device, to which the present invention is carried out.

In FIG. 1, reference numeral 1 denotes a geographical data collecting device, and numeral 2 represents a portable type housing. In the housing 2, there are provided an image pickup unit 3, a GPS device 4, a distance measuring unit 5, a display unit 6 and an operation unit 7. Inside the housing 2, there are provided a control arithmetic unit 8, a storage unit 9, an input/output control unit 10, a tilt sensor 11, an azimuth sensor 12, and a radio receiving unit 13. The image pickup unit 3 is a digital camera, for instance. The image pickup unit 3 comprises an objective lens 14 and an image pickup element 15, which is an aggregate of a multiple of pixels such as CCD, CMOS sensor, etc. The image pickup element 15 can identify an address of each individual pixel (a position in the image pickup element). An image of an object, formed on the image pickup element 15, is outputted from the image pickup element 15 to the control arithmetic unit 8 as a digital image signal, and the image is stored in the storage unit 9 via the control arithmetic unit 8. In the figure, reference numeral 16 denotes a chargeable battery or a dry cell used as a power source of the geographical data collecting device 1.

The distance measuring unit 5 has a non-prism type electro-optical (light wave) distance measuring instrument. A distance measuring light is projected to an object to be measured, and by receiving a reflection light from the object to be measured, a distance to the object to be measured can be measured. The distance measuring light may be an infrared light or a visible light. When the visible light is used, the measuring point can be visually identified.

The display unit 6 is to display the image thus picked up and the display unit 6 is designed as a touch panel. An operator can perform the processing as necessary from the display unit 6. The operation unit 7 has operation buttons as necessary (not shown). The buttons are, for instance, power on-off buttons for turning the power on and off, shutter buttons for taking the image, display switchover buttons for switching over display screens, measurement buttons for performing measurement, and other types of buttons. The desired proceedings can be carried out by operation of these buttons.

A display screen of the display unit 6 can be designed as one-screen or as two screens or more divided according to an image display program.

Figure 2:
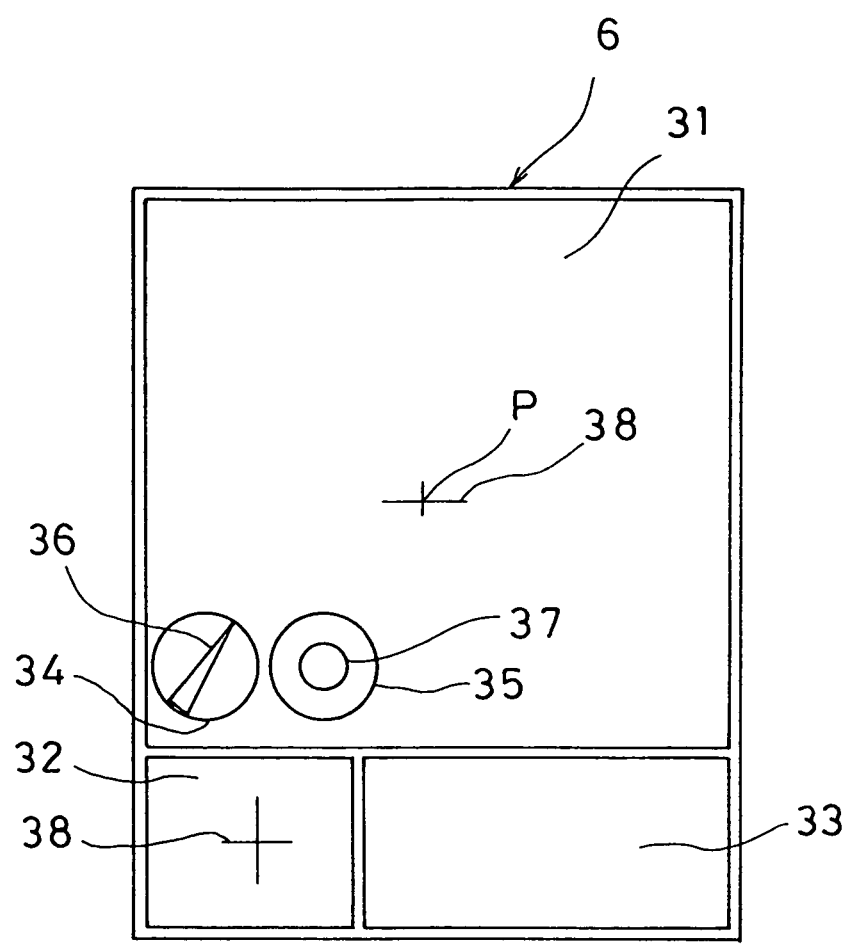
FIG. 2 is an explanatory drawing to show an example of a display on a display unit provided in the geographical data collecting device.

FIG. 2 shows an example where the screen of the display unit 6 is divided to three sections. The screen comprises a main screen 31, a first sub-screen 32, and a second sub-screen 33 or the like. For instance, a wide-range image in a measuring direction is displayed on the main screen 31, an enlarged screen of a section near the measuring point is displayed on the first sub-screen 32, and character information such as information on measuring distance, measuring direction, etc. is displayed on the second sub-screen 33. The aspect of the division of each screen can be changed as necessary. The contents of display can be changed by switching over the screen. For instance, an enlarged screen of a section near the measuring point is displayed on the main screen 31, and a wide-range image in the measuring direction is displayed on the first sub-screen 32.

The main screen 31 comprises an azimuth display part 34 and a tilting display part 35. In the azimuth display part 34, an azimuth in a measuring direction is displayed. In a case a needle 36 in the azimuth display part 34 is directed toward right above, thus case indicates that the measuring direction is due north. On the tilting display part 35, tilting status of the geographical data collecting device 1 is displayed. In a case a small circle 37 in the tilting display part 35 is positioned at the center, thus case indicates that the geographical data collecting device 1 is in horizontal position.

Therefore, the images taken by the image pickup unit 3 are displayed on the display unit 6, and a distance measurement data measured by the distance measuring unit 5, a tilting detected by the tilt sensor 11, and an azimuth detected by the azimuth sensor 12 are displayed as angle measurement data.

The center of an image displayed on the display unit 6 indicates a collimating direction of the distance measuring unit 5. The measuring point measured by the distance measuring unit 5 concurs with the center of the image. A cursor 38 to indicate the center of the image, e.g. a cross symbol, is displayed in the image. In case the measuring point as measured by the distance measuring unit 5 does not concur with the center of the image, offset is determined in advance, and the cursor is displayed at the position compensated by the off set.

The storage unit 9 has a storage medium (not shown), and data can be written or read via the control arithmetic unit 8. In the storage medium, various types of programs for operating the geographical data collecting device 1 are provided. These programs include, for instance: a sequence program for performing the measurement, an image processing program for processing the image taken, a measurement compensating program for compensating the measurement data by GPS based on compensation information described hereafter, an image display program for displaying data and image on the display unit 6, a calculation program for calculating a distance or an area from a plurality of position data, a communication program for performing communication with a compensation information receiver 18 described hereafter, and other programs.

The storage medium may comprise an internal storage medium such as semiconductor memory, HD, etc., which are accommodated and fixed in the geographical data collecting device 1, and a portable storage medium, which is removably attached on the storage unit 9. As the portable storage medium, a small type storage medium is used, which is typically represented by a memory card or the like, and can be accommodated in the geographical data collecting device 1. As an auxiliary storage unit, an external storage unit such as an external HD unit, which can be connected to the geographical data collecting device 1, may be used.

The input/output control unit 10 can be connected to an external processing unit, e.g. a personal computer (PC) and can output the data stored in the storage unit 9 to the PC. Also, the input/output control unit 10 can input the data from the PC to the storage unit 9, and the input/output control unit 10 can also write or rewrite various types of programs as described above in the storage unit 9. Geographical data such as map data including at least the geographical point of the object to be measured are inputted in advance to the storage unit 9 via the input/output control unit 10.

The control arithmetic unit 8 develops the programs stored in the storage unit 9, displays images on the display unit 6, performs the image processing on the image data obtained at the image pickup element 15, and controls the distance measurement of the distance measuring unit 5. Based on the distance measurement data, angle measurement data obtained by the tilt sensor 11 and the azimuth sensor 12, the control arithmetic unit 8 calculates a horizontal distance, calculates an area and the three-dimensional coordinates and controls a communication with the radio receiving unit 13.

During distance measurement and data collecting by the geographical data collecting device 1, the tilt sensor 11 detects tilting of the geographical data collecting device 1 with expect to the horizontal position and inputs the results to the control arithmetic unit 8. The control arithmetic unit 8 displays the tilting condition on the display unit 6.

As the azimuth sensor 12, a simple type magnetic azimuth sensor (compass) is used, and the azimuth sensor 12 detects a direction of optical axis of the objective lens 14, i.e. an image pickup direction of the image pickup unit 3—namely, the measuring direction. The result of detection is inputted to the control arithmetic unit 8, which displays the azimuth on the display unit 6. The compass has high accuracy for polar direction (N), while the accuracy of the compass is decreased due to environmental condition, with respect to the other directions. The control arithmetic unit 8 acquires data of total circumference when the device is placed in horizontal position and in vertical position in advance. Then, the control arithmetic unit 8 fulfills the function of calibration by applying the acquired result to an equation of a circle and by using the result of the data acquired to compensate by interpolation the data other than the data of polar direction.

The radio receiving unit 13 receives GPS measurement compensating information as transmitted from the compensation information transmitter/receiver 17, to be described hereafter and sends a compensation information 21 to the control arithmetic unit 8.

In general, at a single position measurement by a GPS device, factors of errors are included, which are caused from the reasons such as propagation delay in ionosphere or in the atmosphere, and measurement accuracy is in a range of about 10 meters to 50 meters. Therefore, there are D-GPS (Differential GPS) and RTK-GPS (Real-Time Kinetic GPS) measurement accuracy of which are improved. D-GPS receives the compensation information 21 obtained by electric wave or medium wave beacon of FM broadcasting issued from a standard station of which the exact position is known and uses the compensation information 21. As a result, the measurement accuracy can be improved from several tens of cm to several meters. In the RTK-GPS as described above, signals which are received and acquired at the same time at a fixed point and a moving point, serving as a reference. The received signals are transferred to the moving point by using means such as a radio device. By determining the position on the moving point side, the measurement accuracy can be improved to the extent of about 1 centimeter to 2 centimeters. VRS-GPS (virtual reference system GPS) is called as a virtual reference point system. From observation data at a plurality of electronic reference points, a condition is created as if there is a reference point near the actual site of surveying, and the surveying operation with high accuracy can be accomplished by using a single VRS-GPS receiver. The device according to the present invention is a handy type small integrated geographical data collecting device 1. When the accuracy is not an important factor, it may be preferable to install a D-GPS device, for instance, which is easier to use.

The compensation information transmitter/receiver 17 comprises the compensation information receiver 18 and the compensation information transmitter 19. The compensation information 21 can be received by a handy phone, and the handy phone can be used in simple manner as the compensation information receiver 18. The compensation information 21 received by the compensation information receiver 18 may be transmitted to the radio receiving unit 13 by using transmission function of the handy phone. Or, the compensation information transmitter 19 may be provided as shown in the figure, and the compensation information 21 may be transmitted to the radio receiving unit 13 by the compensation information transmitter 19. Some of the handy phones are provided with Bluetooth (registered trademark) function, and for the transmission of the compensation information 21, Bluetooth radio system may be adopted for the transmission of large-capacity data in short distance.

Figure 3:
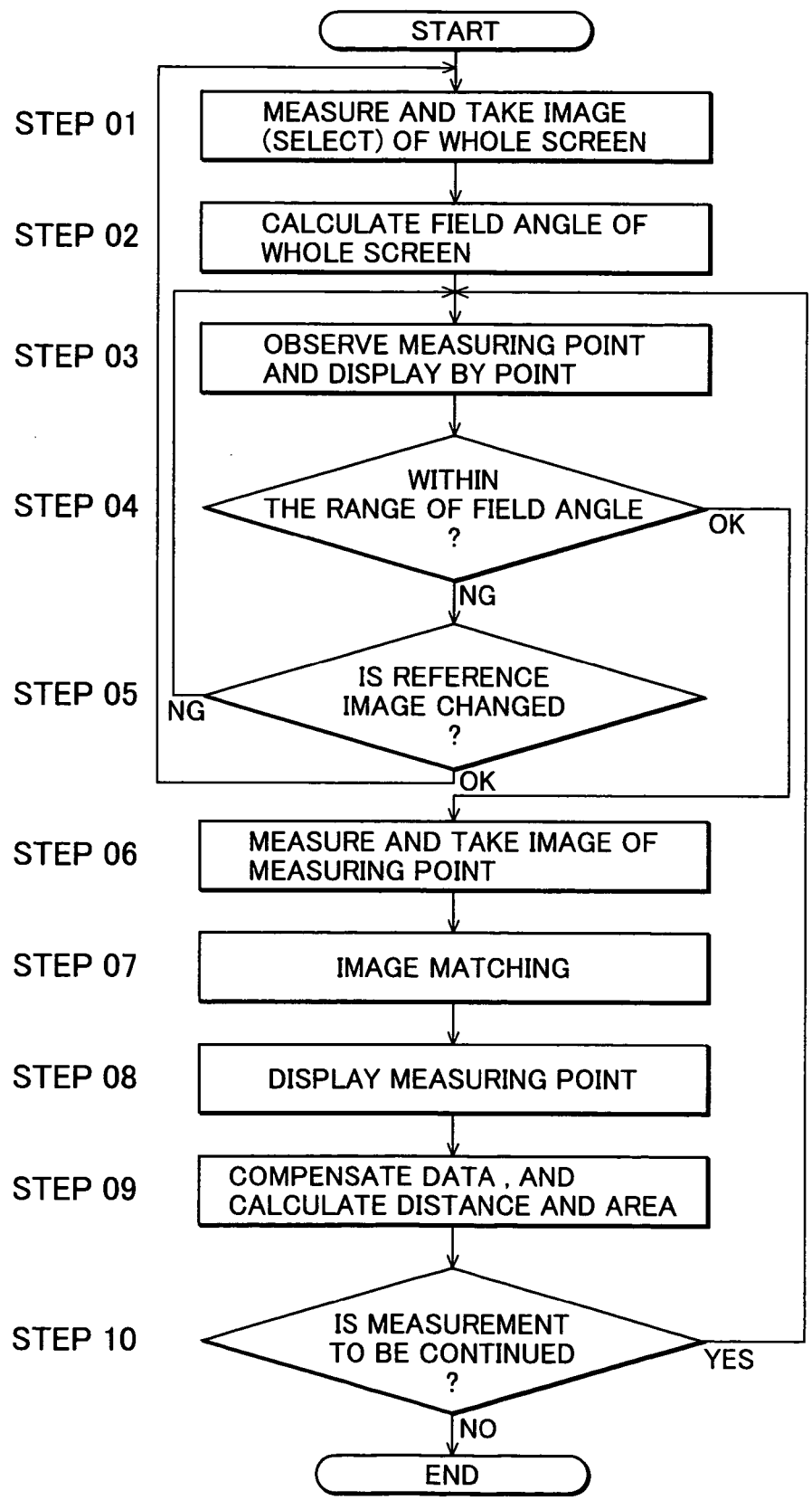
FIG. 3 is a flowchart to show an operation of an embodiment of the present invention.

Now, referring to FIG. 3, a description will be given on the operation of the geographical data collecting device according to the present invention.

When the geographic data collecting device 1 is used, the geographic data collecting device 1 is held by an operator. The operator supports the device by one hand, and the operation unit 7 is operated by the other hand.

First, a measurement range is determined. The operator is positioned at an operation point (which serves as a reference point for the measurement operation). Then, the geographical data collecting device 1 is directed toward the measurement range. The position (the coordinate position) of the operation is acquired by the GPS device 4, and the result is recorded in the storage unit 9.

On the display unit 6, an image taken by the image pickup element 15 is displayed as a moving picture, and the operator judges from the image whether the measurement range is adequate or not. If it is judged that the measurement range is adequate, the measurement operation is started. (Step 01) In a condition that the tilting of the geographical data collecting device 1 displayed on the tilting display unit 35 is in horizontal position or in approximately horizontal position, the image of the measurement range is taken by operation of the operation unit 7. The image thus picked up is displayed on the main screen 31 of the display unit 6 as a reference image 39 (see FIG. 4). During the measurement of the measuring point, it is preferable to hold the geographical data collecting device 1 at horizontal position. Even when the geographical data collecting device 1 is not at the horizontal position, the tilt angle of the geographical data collecting device 1 during the image-taking in the distance measuring operation is measured by the tilt sensor 11 and the result is recorded in the storage unit 9. As a result, the result of the distance measurement can be accurately compensated to horizontal distance based on the recorded tilt angle (Step 02) Field angles (angles of view) in horizontal direction and in vertical direction of the reference image 39 as a whole (hereinafter referred as "horizontal whole angle" and "vertical whole angle" respectively) can be calculated.

The horizontal whole angle H can be obtained by: HS=±arc TAN [(the number of horizontal pixels in the whole image× one pixel size (or pixel pitch))/2/focal distance]. The vertical whole angle V is given by: VS=±arc TAN [(the number of vertical pixels in the whole image×one pixel size (or pixel pitch))/2/focal distance]. For instance, the field angle of the image pickup element 15 in the present embodiment is given by: HS=±26°; VS=±20°.

Here, what is detected by the tilt sensor 11 corresponds to a vertical angle, and what is detected by the azimuth sensor 12 corresponds to a horizontal angle. When the geographical data collecting device 1 is maintained at the horizontal position, it is assumed that the center of the image has: horizontal angle=0, and vertical angle=0.

(Step 03) To determine the measuring points, observation for measurement is made on the measuring point. The geographical data collecting device 1 is directed toward the measuring point. The image pickup unit 3 enlarges and displays an image of collimating direction of the distance measuring unit 5, for instance, as a finder image on the first sub-screen 32. The display range of the finder image is limited to the range near the measuring point in such manner that the measuring point can be easily recognized.

The measuring point is collimated, and provisional measurement is carried out by operation from the operation unit 7. A horizontal angle and a vertical angle are measured on the measuring point by the tilt sensor 11 and the azimuth sensor 12 respectively, and based on the measurement result, the measuring point is displayed on the whole image.

(Step 04) Or, it is judged whether it is within the range of HS and VS. The tilt sensor 11 and the azimuth sensor 12 are not very high in accuracy. In particular, because the azimuth sensor 12 is designed as magnetic type, the azimuth sensor 12 is easily influenced by the surrounding conditions, and high expectation cannot be placed on the accuracy. For this reason, due to the measurement errors of the tilt sensor 11 and the azimuth sensor 12, the provisional measuring point may be deviated from HS and VS. Also, the provisional measuring point may be deviated from the range of HS and VS due to erroneous operation by the operator.

In case the provisional measuring point is within the range of HS and VS, it is advanced to Step 06.

(Step 05) In case the provisional measuring point is deviated from the range of HS and VS, it is judged whether the reference image 39 has been appropriate or not. This is because it may be necessary to change the reference image 39 when priority should be given on the measurement of the provisional measuring point. When the reference image 39 is changed, it is turned back to Step 01, and the operation from the acquisition of the reference image 39 is repeated. When there is no change in the reference image 39, it is turned back to Step 03, and the procedure of the provisional measurement is repeated.

(Step 06) In case the provisional measuring point is within the range of HS and VH in Step 04, main measurement is carried out. The distance is measured on the measuring point by the distance measuring unit 5, and an image with the measuring point at the center is acquired by the image pickup unit 3 as an image of the measuring point (a measured image 41). The image pickup of the measuring point is carried out at the same magnification as that of the reference image 39. The angle measurement are performed by the tilt sensor 11 and the azimuth sensor 12. The image at the measuring point and the results of distance measurement and angle measurement are recorded in the storage unit 9. In this case, the size of the measured image 41 acquired may be in such size as necessary for image matching (to be described later). For instance, measured image 41 is in the size of 15×15 pixels (0.5°×0.5° in field angle) with the measuring point (collimating point) at the center.

(Step 07) The measuring point, for which the measurement has been executed, is plotted on the reference image 39 based on the results of measurement. As described above, when the position on the image is identified based on the measurement angle, the measurement error is too big, and accurate plotting cannot be expected. Therefore, in the present invention, the measuring point is plotted on the reference image 39 according to the method of image matching.

Figure 4:
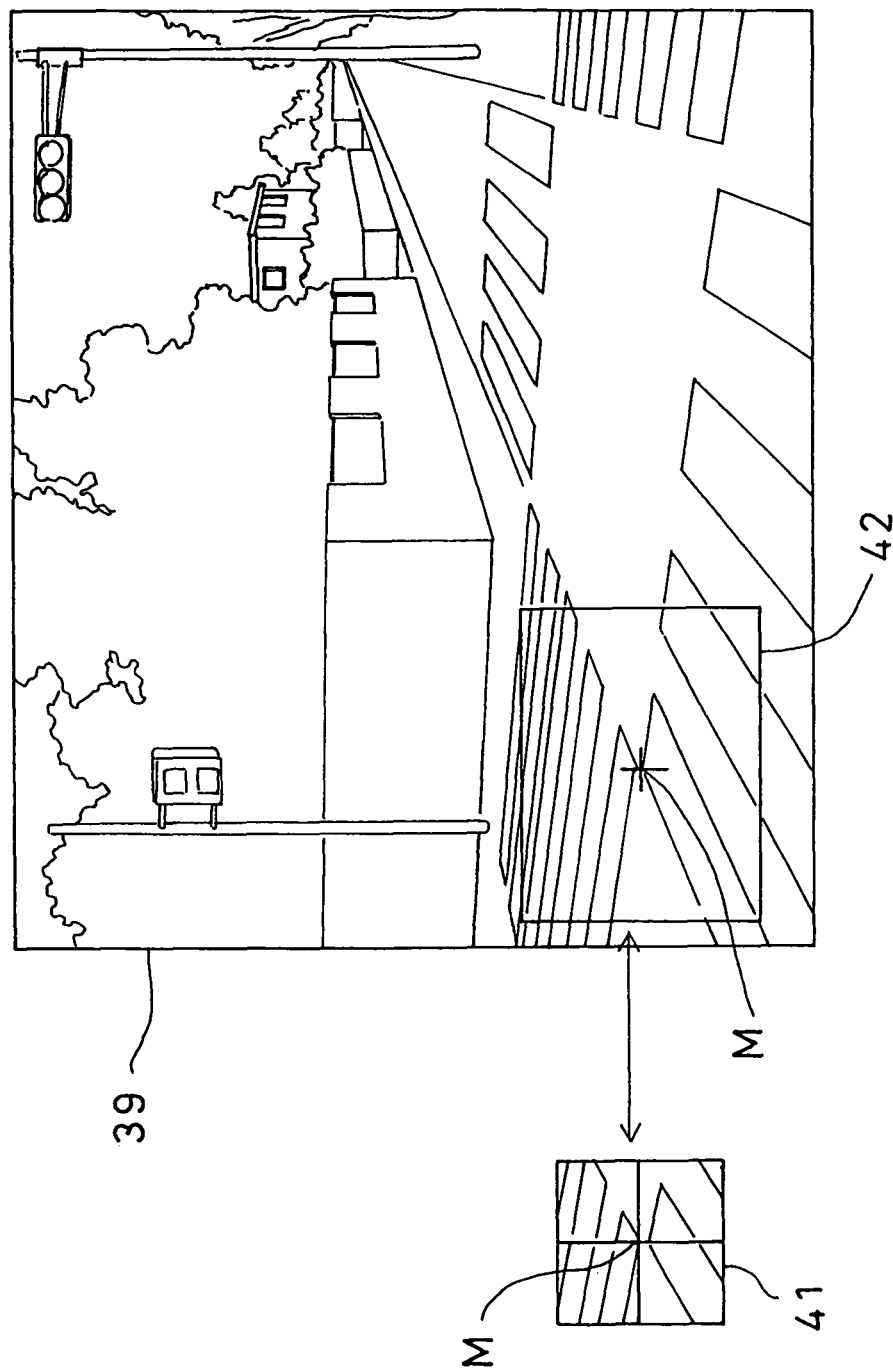
FIG. 4 is an explanatory drawing of the image matching carried out in the embodiment of the invention.

Next, referring to FIG. 4, a description will be given on the plotting of the measuring point.

A window with the same size as the measured image 41 is set in the reference image 39 as a template. This template is moved within a predetermined range, and a position is searched where density value of the image in the template is most similar to density value of the measured image 41.

The size of a searching range 42 is set up by taking measurement errors of the tilt sensor 11 and the azimuth sensor 12 into account, and the position in the reference image 39 obtained by the horizontal angle and the vertical angle measured at the measuring point is regarded as the center. In the present embodiment, a size about three times as large as the size of template or a size of about 45×45 pixels is set up by taking the accuracy of the compass and the tilt sensor 11 into account.

As the matching method, the methods such as normalized correlation, SSDA (sum of squared difference), etc. are generally used. Here, a description will be given on the method based on the LSM (Least-Squares Matching) as a matching method effective for an object with irregular surfaces or projection distortion.

Figure 5:
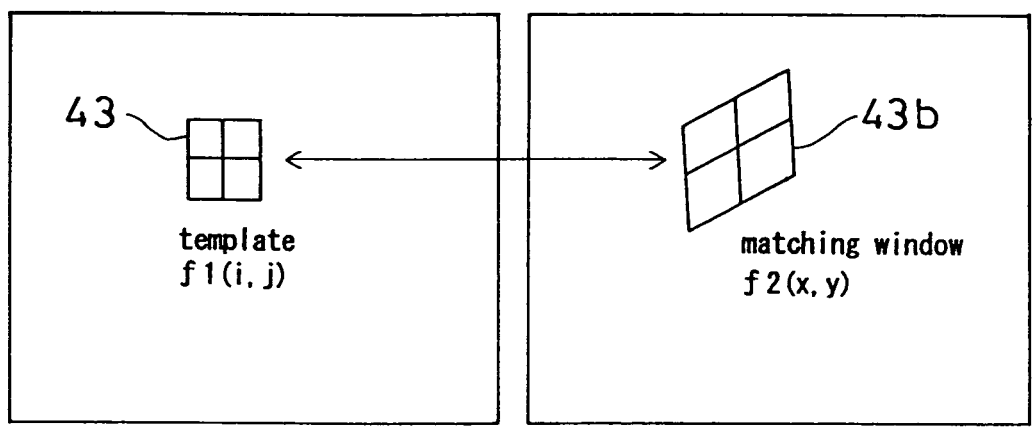
FIG. 5 is an explanatory drawing about the least-squares method, which is an example of the image matching.

The Least-Squares Matching: LSM is a means that while changing by affine transformation a configuration of a window 43b, which corresponds to a template 43 in the image of FIG. 5(A), as shown on a window 43b in the image of FIG. 5(B), a matching between the template 43 and the window 43b is performed and a measurement is made on a matching point in the units of sub-pixel.

The template is f1(i,j) in the measured image 41 when the matching is performed. A deformed matching window is f2(x,y) in the whole image, the transformation of the matching window is approximated by affine transformation of the equation as given below:

$$x = a1\ i + a2\ j + a3, \quad y = a4\ i + a5\ j + a6$$

The density difference at each pixel to be compared is given by the following equation:

$$d(i, j) = f1(i, j) - f2(x, y)$$
$$= f1(i, j) - f2(a1\ i + a2\ j + a3,\ a4\ i + a5\ j + a6)$$

Next, the condition where the sum of squared density differences is set to the least is determined. That is, the value of a1 to a6 to satisfy the condition "$\Sigma d\ (i,j)^2 \to \min$" is determined.

Here, the symbols a1, a2, a4 and a5 represent the transformation of the template. The symbols a3 and a6 are the coordinates of the detecting position to be determined. Thus, the position of sub-pixel accuracy can be detected.

In the image matching, the matching is performed from the measured image 41 to the reference image 39, and f2(x,y) corresponding to f1(i,j) was obtained. Then, reverse matching was performed further, and f1(i,j) corresponding to f2(x,y) was obtained. Reliability may be increased by checking whether the initial image coordinates can be obtained or not. If the results do not match (mis-matching), approximate values as obtained from a compass and a tiltmeter are used. Or, in case of mis-matching, it may be designed such manner that the operator designates the position of the measuring point from the operation unit 7 (touch panel) on the reference image and the image matching is performed again. The designated position of the measuring point in this case may depend on the memorizing ability of the operator or may be referred to the measured image.

(Step 08) When the image matching is completed, the measuring point is displayed (plotted) on the reference image 39.

(Step 09) When the measuring point M is plotted on the reference image 39, a horizontal field angle and a vertical field angle are determined from the position of the pixel at the plotted position, and a horizontal angle and a vertical angle of the measuring point are measured by a calculation. Based on the result of calculation, the vertical angle and the horizontal angle measured by the tilt sensor 11 and the azimuth sensor 12 can be compensated.

(Step 10) Further, it is judged whether the measurement should be continued or not. In case the measurement should be continued, it is turned back to Step 03, and the procedure for the measurement is repeated.

As the result of the repeating of the measurement, two or more measuring points are plotted at each measurement on the reference image 39. Accordingly, the operator can grasp the measurement condition at real time by the measuring points displayed on the reference image 39. As a result, adequate measuring points can be selected. Further, duplication of measurement can be avoided, and the measurement operation can be carried out with no omission.

Each of the measuring points displayed on the reference image 39 has the three-dimensional data. By designating two measuring points on the reference image 39 via the display unit 6, a horizontal distance between two points can be calculated. By designating three or more measuring points, a horizontal area enclosed by the measuring points can be calculated from the coordinate data of the measuring points.

Therefore, for instance, when the measurement is performed on cracking in the ground on a road caused by the disaster, position (coordinates), length and extent of the cracking in the ground can be measured in simple and quick manner. At the same time because the conditions of the cracking in the ground can be acquired by the image, sufficient information can be obtained by numerical value data and image data.

According to the present invention, measurement can be carried out on a distant place and on surrounding conditions from a position where the geographical data collecting device 1 is held. As a result, the measurement can be performed for wide range without moving the position of the operator, and high working efficiency can be assured.

The invention claimed is:

1. A geographical data collecting device, comprising:
    a distance measuring unit for projecting a distance measuring light and for measuring a distance to an object to be measured,
    an image pickup unit for taking an image in a measuring direction,
    a display unit for displaying said taken image,
    a touch panel installed to match a position of screen of said display unit,
    a tilt sensor for detecting a tilting,
    an azimuth sensor for detecting a horizontal angle in the measuring direction, and
    a control arithmetic unit, wherein said control arithmetic unit:
    takes an image of a measurement range using said image pickup unit,
    displays said taken image of said measurement range as a reference image on said display unit,
    acquires a measured image with a measuring point as a center using said image pickup unit,
    determines a distance from said geographical data collecting device to said acquired measuring point using said distance measuring unit,
    uses image matching to calculate the location of the measuring point in said reference image,
    repeats said acquires, determines and uses steps for at least one additional measuring point, and
    displays previously measured measuring points on said reference image.

2. The geographical data collecting device according to claim 1, wherein said measured image includes the measuring points and is a part of an image taken by said image pickup unit, and wherein a center of a searching range for the purpose of matching in said reference image is set up according to a vertical angle and a horizontal angle obtained by said tilt sensor and said azimuth sensor at the time when said measured image is acquired.

3. The geographical data collecting device according to claim 2, wherein said control arithmetic unit sets said searching range to such a range as to include an extent of measurement errors of said tilt sensor and said azimuth sensor with respect to said measured image.

4. The geographical data collecting device according to claim 3, wherein said control arithmetic unit displays a plurality of measuring points to match a plurality of measurements on said reference image and calculates a horizontal distance between two measuring points on said reference image as designated via said touch panel.

5. The geographical data collecting device according to claim 3, wherein said control arithmetic unit displays a plurality of measuring points to match a plurality of measurements on said reference image and calculates a horizontal area enclosed by at least three measuring points on said reference image as designated via said touch panel.

6. The geographical data collecting device according to claim 1, wherein said control arithmetic unit sets, as reference, the vertical angle, the horizontal angle and the azimuth angle measured by said tilt sensor and said azimuth sensor at the time when said reference image is taken and compensates a vertical angle and a horizontal angle according to the measuring points calculated based on the result of matching.

7. The geographical data collecting device according to claim 1, further comprising a GPS device, wherein said control arithmetic unit determines the measuring points through the matching of said reference image and said measured image based on geographical data obtained by the GPS device and based on the vertical angle, the horizontal angle and the azimuth angle which are initial values of the matching and are measured by said tilt sensor and said azimuth sensor when said reference image is taken, said control arithmetic unit corrects the vertical angle and the horizontal angle based on the measuring points obtained, and said control arithmetic unit calculates the three-dimensional coordinates of the measuring point based on the corrected vertical angle and the corrected horizontal angle and on the results of distance measurement.

8. The geographical data collecting device according to claim 7, further comprising a radio receiving unit, wherein compensation information is received by said radio receiving unit, and measurement result measured by said GPS device is compensated according to said compensation information.

9. The geographical data collecting device according to claim 1, wherein said azimuth sensor is a magnetic azimuth sensor and determines data of total circumference in horizontal direction and in vertical direction before use of said geographical data collecting device, performs compensation by interpolation based on the data of total circumference, and compensates the results of detection.

10. The geographical data collecting device according to claim 1, wherein said control arithmetic unit determines a second measuring point on said reference image through image matching of said reference image and said measured image, said control arithmetic unit determines a third measuring point on said measured image through reverse image matching from said reference image to said measured image, and in case the coordinates of said third measuring point on said measured image do not concur with the coordinates of the first measuring point obtained at the time of measurement, it is judged as mis-matching, and said control arithmetic unit permits to designate the measuring point on said reference image manually from the touch panel, and said control arithmetic unit performs re-matching of said reference image and said measured image based on the designated measuring point.

11. A method of collecting geographical data, using a geographical data collecting device comprising an image pickup unit, a display unit, a distance measuring unit and an arithmetic unit, said method comprising:
    taking an image of a measurement range using said image pickup unit;
    displaying said image on said display unit as a reference image;
    selecting a measuring point in said reference image;
    acquiring a measured image with the measuring point as a center using said image pickup unit;
    determining a distance from said geographical data collecting device to said measuring point using said distance measuring unit;
    using image matching to calculate the location of said measuring point in said reference image using said control arithmetic unit;
    displaying the measuring point on said reference image; and repeating said selecting, acquiring, determining, using, and
    displaying steps for at least one additional measuring point, wherein each measuring point remains displayed on said reference image.

* * * * *